US 12,462,847 B1

United States Patent
Pollard et al.

(10) Patent No.: US 12,462,847 B1
(45) Date of Patent: Nov. 4, 2025

(54) SYSTEMS AND METHODS FOR AUTOMATICALLY EDITING MEDIA DATA

(71) Applicant: Higher Pixels, Inc., Jacksonville, FL (US)

(72) Inventors: John Loring Pollard, Jacksonville, FL (US); Bryan Joseph Traywick, Savannah, GA (US); Thomas Lee Rossi, Jacksonville, FL (US); Kevin Michael Finn, Jacksonville, FL (US); Bryan David Hunt, Jacksonville, FL (US); David Joseph Ditges, Jacksonville, FL (US)

(73) Assignee: Higher Pixels, Inc., Jacksonville, FL (US)

( * ) Notice: Subject to any disclaimer, the term of this patent is extended or adjusted under 35 U.S.C. 154(b) by 44 days.

(21) Appl. No.: 18/408,862

(22) Filed: Jan. 10, 2024

Related U.S. Application Data

(60) Provisional application No. 63/479,472, filed on Jan. 11, 2023.

(51) Int. Cl.
  *G11B 27/036* (2006.01)
  *G11B 27/34* (2006.01)

(52) U.S. Cl.
  CPC ............ *G11B 27/036* (2013.01); *G11B 27/34* (2013.01)

(58) Field of Classification Search
  CPC .............................. G11B 27/036; G11B 27/34
  See application file for complete search history.

(56) References Cited

U.S. PATENT DOCUMENTS

| | | | |
|---|---|---|---|
| 7,039,599 B2 | 5/2006 | Merriman et al. | |
| 7,805,740 B2 | 9/2010 | Gilboa et al. | |
| 8,798,995 B1 | 8/2014 | Edara | |
| 10,410,248 B2 | 9/2019 | Yruski et al. | |
| 11,301,902 B2 | 4/2022 | MacDougall et al. | |
| 2008/0255686 A1 | 10/2008 | Irvin et al. | |
| 2008/0275775 A1 | 11/2008 | Gonen et al. | |
| 2009/0018904 A1* | 1/2009 | Shipman | G06Q 30/0269 705/14.66 |
| 2009/0092374 A1* | 4/2009 | Kulas | H04N 21/6125 386/282 |
| 2009/0157450 A1* | 6/2009 | Athsani | G06Q 30/0276 705/35 |
| 2013/0179909 A1 | 7/2013 | Gilboa et al. | |

(Continued)

FOREIGN PATENT DOCUMENTS

WO 2006115785 A2 11/2006

*Primary Examiner* — Mishawn N. Hunter
(74) *Attorney, Agent, or Firm* — John Rizvi; John Rizvi, P.A.—The Patent Professor ®

(57) ABSTRACT

A method for editing computerized data includes determining media data to be edited. The method also includes analyzing the media data to determine one or more candidate locations in the media data for editing. Analyzing the media data includes identifying the one or more candidate locations based on at least one content of the media data. The method includes determining at least one item of pre-generated content to be inserted into the media data. Additionally, the method includes selecting at least one of the one or more candidate locations. The method includes inserting the at least one item of pre-generated content into the media data at the at least one of the one or more candidate locations.

17 Claims, 5 Drawing Sheets

(56) References Cited

U.S. PATENT DOCUMENTS

| | | | |
|---|---|---|---|
| 2022/0070540 A1* | 3/2022 | Wu | H04N 21/85406 |
| 2022/0076026 A1* | 3/2022 | Walker | G06V 40/161 |
| 2022/0312048 A1* | 9/2022 | Chen | H04N 21/44016 |

* cited by examiner

SYSTEMS AND METHODS FOR AUTOMATICALLY EDITING MEDIA DATA

CROSS-REFERENCE TO RELATED APPLICATION

This application claims the benefit of U.S. Provisional Patent Application 63/479,472, filed Jan. 11, 2023, which is hereby incorporated by reference herein in its entirety.

FIELD OF THE INVENTION

The present disclosure relates generally to data processing, and more particularly, to systems and methods that automatically edit media data.

BACKGROUND

The availability of electronic devices that include professional-quality cameras and microphones has generated an explosion of media content creation and consumption. This includes video content (e.g., video clips, movies, documentaries, variety shows, etc.) and audio content (e.g., music, podcast, lessons, audiobooks etc.) on an unlimited number of topics. Content creation is not limited to professional media production companies and individuals, but also includes amateur artists that are creating unique content. Moreover, the rise of the Internet and high-speed computer networks has created an avenue for distributing this content. The availability of platforms for publishing content such as YouTube, Instagram, Spotify, and TikTok has reduced the cost and complexity of publishing content for both professional and amateur content creators.

Regardless of the sophistication level, content creators and artists, whether amateur or professional, desire to monetize their content creation. This allows the content creators and artists to reap the rewards of their efforts as well as provide new capital for the creation and publication of additional content. A common method for monetizing media content is to include advertisements in the media content. Conventionally, this would involve a content creator contacting a potential advertiser and securing an advertising contract. The content creator would then have to generate advertising content, e.g., advertising read, and generate the advertising content at the time of the creation of the media content. For example, a podcaster might read an advertisement at the start or end of a podcast. This, however, burdens the content creator with the task of re-creating the advertising content each time media content is created. Additionally, an advertiser might provide a content creator with a pre-generated advertising segment or content. But this process requires the content creator to manually edit the media content and insert the advertising segment. Moreover, the above problems not only apply to advertising content, but other types of auxiliary content that can be added, such as public service announcements, previews of other content, title or end credits, and the like.

There remains a need in the art for a solution to at least one of the aforementioned problems. For example, there is an established need for systems and processes that add auxiliary content to media data that assist both professional and amateur content creators. Ideally, it would be useful if the systems and processes are robust, efficient, and seamless.

SUMMARY

In an aspect, a method for editing computerized data includes determining media data to be edited. The method also includes analyzing the media data to determine one or more candidate locations in the media data for editing. Analyzing the media data includes identifying the one or more candidate locations based on at least one content of the media data. The method includes determining at least one item of pre-generated content to be inserted into the media data. Additionally, the method includes selecting at least one of the one or more candidate locations. The method includes inserting the at least one item of pre-generated content into the media data at the at least one of the one or more candidate locations.

In an aspect, a non-transitory computer readable medium is provided that when executed, cause a data processing system perform operation comprising: (i) identifying media data to be edited; (ii) analyzing the media data identified and identifying one or more candidate locations therein for editing based on at least one content portion of the media data analyzed; (iii) determining at least one item of pre-generated content to be inserted into the media data; (iv) selecting at least one of the one or more candidate locations identified; and (v) editing the media data analyzed by inserting the at least one item of pre-generated content into the media data analyzed at least one of the one or more candidate locations selected.

In another aspect, the pre-generated content comprises at least one of advertisements, public service announcements, previews of other content, and bibliographic information.

In another aspect, the pre-generated content based on predetermined rules is automatically selected by a media editing system.

In another aspect, a selection of the pre-generated content is received from a creator or publisher of the media data.

In another aspect, the selection of at least one of the one or more candidate locations is performed automatically by a media editing system.

In another aspect, the selection of at least one of the one or more candidate locations is performed by a creator or publisher of the media data.

In another aspect, the one or more candidate locations selected are equally distributed in time throughout the at least one content portion of the media data.

In another aspect, the one or more candidate locations selected minimize adverse impacts on the at least one content portion of the media data.

In another aspect, a duration of an episode from the media data analyzed is identified and a maximum number is insertion points is determined using the identified episode duration.

In another aspect, a plurality of silence timestamps is generated from the media data analyzed.

In another aspect, a plurality of speaker changes are identified from the at least one content portion of the media data by analyzing diarization data.

In another aspect, the diarization data analyzed comprises a list of speaker segments and wherein each speaker segment of the list comprises at least a speaker identify label, a start timestamp, and an end timestamp.

In another aspect, each silence timestamp of the plurality of silence timestamps has a respective duration that does not exceed five (5) seconds.

In another aspect, the edited media data is provided to a plurality of media directories and consumption platforms.

The methods and systems described herein can be implemented by data processing systems, such as one or more smartphones, tablet computers, desktop computers, laptop computers, smart watches, wearable, audio accessories, on-board computer, and other user devices and consumer electronic devices. The methods and systems described herein can also be implemented by one or more data processing systems which execute executable computer program instructions, stored in one or more non-transitory machine readable media that cause the one or more data processing systems to perform the one or more methods described herein when the program instructions are executed. Thus, the embodiments described herein can include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the detailed description below.

These and other aspects, features, implementations, and advantages of the present disclosure will become more readily apparent from the attached drawings and the detailed description of the exemplary embodiments, which follow.

BRIEF DESCRIPTION OF THE DRAWINGS

The exemplary embodiments of the disclosure will hereinafter be described in conjunction with the appended drawings provided to illustrate and not to limit the present disclosure, where like designations denote like elements, and in which.

Like reference numerals refer to like parts throughout the several views of the drawings.

DETAILED DESCRIPTION

The following detailed description is merely exemplary in nature and is not intended to limit the described embodiments or the present disclosure and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations and aspects described below are exemplary implementations and exemplary aspects provided to enable persons skilled in the art to make or use the embodiments of the present disclosure and are not intended to limit the scope of the present disclosure, which is defined by the claims.

Figure 1:
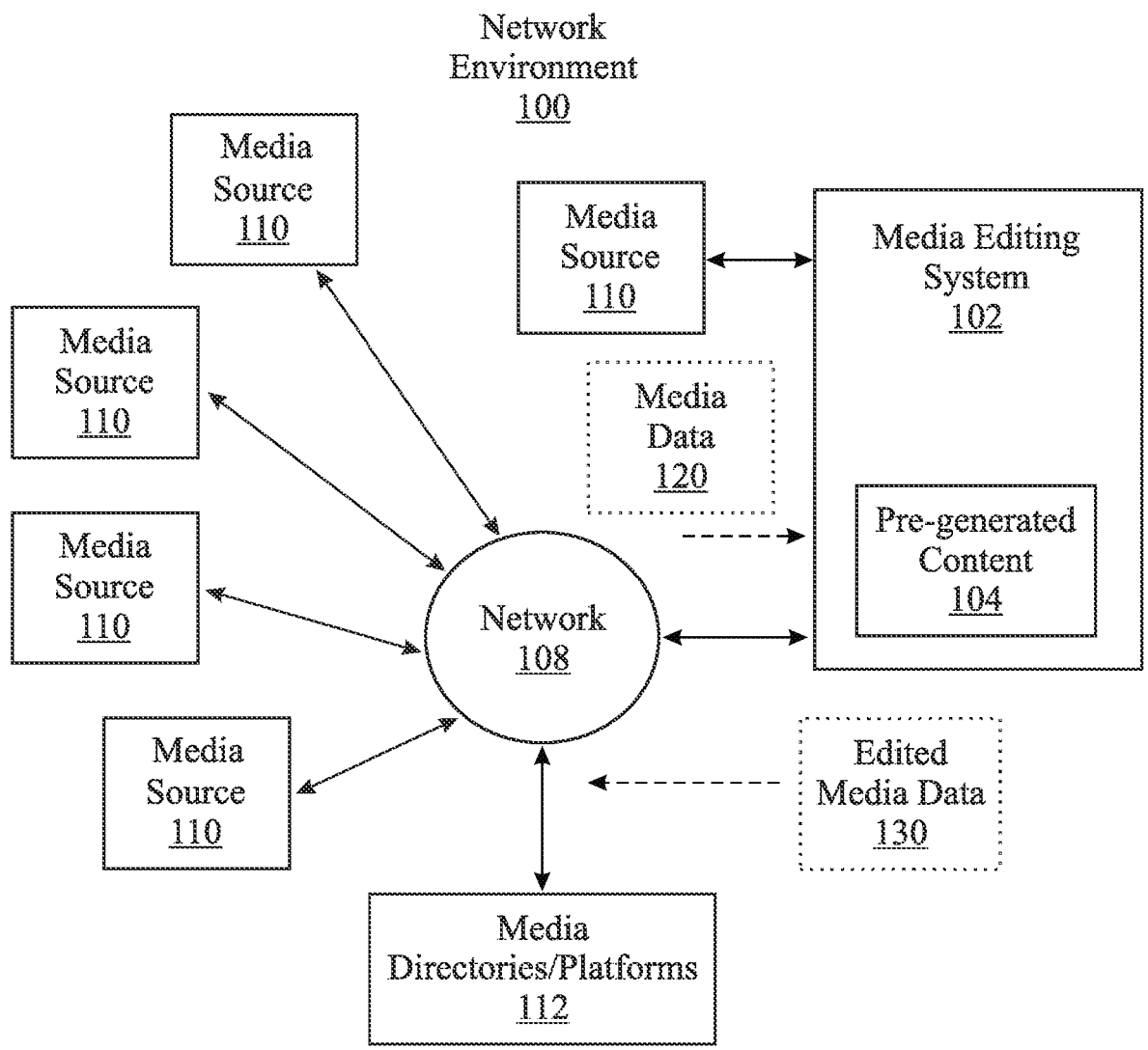
FIG. 1 presents a top diagrammatic view of a network environment in accordance with an embodiment of the present disclosure.

For purposes of description herein, the terms "upper", "lower", "top", "bottom", "left", "rear", "right", "front", "vertical", "horizontal", and derivatives thereof shall relate to the embodiments as oriented relative to an x, y, z coordinate system as illustrated in FIG. 1. These terms are relative terms and not intended to limit functionality and operation of the embodiments of the present disclosure.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the concepts defined in the appended claims. Hence, specific dimensions and other physical characteristics relating to the embodiments disclosed herein are not to be considered as limiting, unless the claims expressly state otherwise.

As shown throughout the figures, the present disclosure is directed towards systems and methods for automatically editing media data, such as streaming audio and/or video, audio and/or video files, data files, and the like. Referring initially to FIG. 1, a network environment, hereinafter network environment 100, is illustrated in accordance with an exemplary embodiment of the present disclosure. While FIG. 1 illustrates various systems and components contained in network environment 100, FIG. 1 illustrates one example of a network environment 100 of the present disclosure, and additional components can be added, and existing systems and components can be removed.

The network environment 100 includes a media editing system 102 that operates within the network environment 100. The media editing system 102 is configured to edit media data 120, such as audio data, video data, multi-media data, and the like to include one or more items of pre-generated content. For example, the pre-generated content can include auxiliary content such as advertisements, public service announcements, previews of other media content, bibliographic content, and the like. The media data 120 can be received from media sources 110. The media sources 110 can directly communicate with the media editing system 102. For example, the media editing system 102 can be coupled to media recording devices such as cameras and microphones. Likewise, for example, the media editing system 102 can be coupled to media storage devices. The media sources 110 and the media editing system 102 can also communicate via a network 108, as described below with reference to FIG. 2.

In embodiments, the media sources 110 are any type of electronic device that can communicate and exchange data via the network 108. For example, the IoT devices 110 can include electronic devices such as smartphones, computers, tablets, and the like. The media sources 110 can be controlled and operated by any type of entity associated with media data, such as content creators, content owners, content publishers, operators of the media editing system 102, and the like. One skilled in the art will realize that the media sources 110 can include any electronic device capable of connecting the network 108 and be individually addressable on the network 108 to send and receive data. The network 108 can include one or more public networks, private networks, or combinations thereof. For example, the network 108 can include the Internet. Likewise, for example, the network 108 can include one or more Long Range Wide Area Network (LoRaWAN) networks for connecting Internet of Things (IoT) devices.

In embodiments, the media editing system 102 includes hardware, software, and the combination thereof to perform the processes and methods described herein. The media editing system 102 is configured to analyze the media data to identify one or more candidate locations to insert the pre-generated content 104. The candidate locations can be temporal locations within the content of the media data 120. The media editing system 102 can analyze the media data 120 to determine optimal temporal locations in which pre-generated content can be inserted with minimal interference with the content of the media data. That is, the media editing system 102 examines the content of the media data 120 to determine ideal locations for inserting the pre-generated content 104.

In embodiments, the media editing system 102 is configured to insert the pre-generated content 104 at the one or more candidate locations. The candidate locations, which are selected, can be based on one or more predetermined rules. For example, the media editing system 102 can prioritize one candidate location over another candidate location in order to reduce the impact on the original content. Likewise, for example, the media editing system 102 can prioritize one candidate location over another candidate location based on its temporal location in the content and the type of pre-generated content 104 being inserted. For instance, premium content or higher-paying advertisements may be prioritized and placed earlier in the content.

In embodiments, the media editing system 102 can edit the media data 120 to insert the pre-generated content 104 thereby generating edited media data 130. The media editing system 102 can be configured to encode/decode and/or transform the media data 120 for editing and re-publication. The media editing system 102 can provide the edited media data 130 to the media sources 110, for example, via the network 108. In embodiments, the media editing system 102 can provide the edited media data 130 to media directories and/or consumption platforms 112 where the edited media data 130 can be publicly available. For example, in the case of a podcast, the edited media data 130 (e.g., the podcast including the inserted advertisements) can be distributed to podcast directories (e.g., Apple Podcasts, Spotify, Google Podcasts, webpages, etc.) so that the public can listen to the edited media data 130 including the advertisements.

In embodiments, the media editing system 102 can determine that pre-generated content 104 should be removed and/or not be inserted. As such, the media editing system 102 can remove one or more of the pre-generated content 104 from the edited media data 130. For example, the media editing system 102 can remove the pre-generated content 104, for example, if a platform does not allow the advertisement or adds its own advertisements, prior to distributing the media data to the media directories and/or platforms 112. In another example, if an advertiser buys 10,000 ad downloads, then once the ad is downloaded 10,000 times, the media editing system 102 can automatically remove the advertisement, and the media file will be stitched back together and distributed as if it had never been altered.

Figure 2:
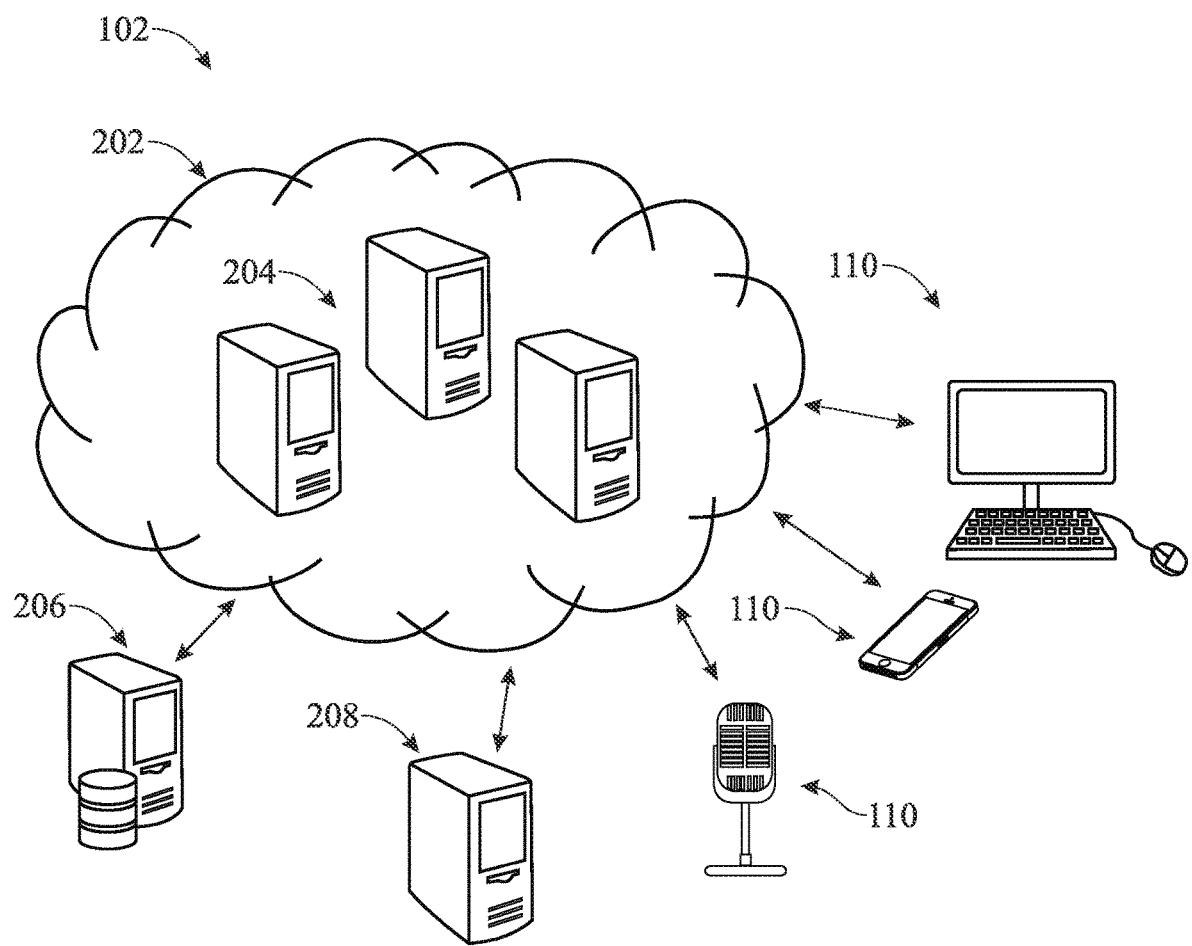
FIG. 2 presents a top diagrammatic view of an editing system for use in the network environment of FIG. 1 in accordance with an embodiment of the present disclosure.

The media editing system 102 can also be implemented as a software program or software application containing modules or components that are configured to perform the processes as described herein. Likewise, the media editing system 102 can be implemented as a portion of other software programs or applications. In either case, the media editing system 102 can be configured to include the necessary logic, commands, instructions, and protocols to perform the processes and methods described herein. The media editing system 102 can be written in any type of conventional programming languages such as C, C++, JAVA, Perl, Python, and the like. In this embodiment, the media editing system 102 can be executed on one or more computing systems or devices as described below. The computing systems or devices can be one more of any type of computing system capable of executing the media editing system 102, such as servers, laptops, desktops, cloud computing services, and the like. The computing system and devices can include several hardware resources, which are used to execute the media editing system 102 such as processors, memory, network hardware, and bandwidth, storage devices, etc., and a number of software resources, such as operating systems, application programs, software appliances, etc. The media editing system 102 can be stored in computer-readable storage devices or media (CD, DVD, hard drive, portable storage memory, etc.) whether local to the computing system and devices or remotely located. FIG. 2 illustrates the media editing system 102 in accordance with an exemplary embodiment of the present disclosure. The media editing system 102 includes internal and external data resources for implementing and executing the editing process as described above and below in further detail.

The media editing system 102 can include a data management system 202 that communicates with one or more media sources 110, e.g., a computer, laptop, tablet, smart phone, media recording device, etc., via the network 108 (not shown). In some embodiments, the data management system 202 can be implemented as a physical data management system. In some embodiments, the data management system 202 can be implemented as a cloud-based data management system. In any embodiment, the data management system 202 can include one or more servers 204 such as application servers, database servers, and data servers. The media sources 110 can include one or more devices associated with profiles of the media editing system 102. The media editing system 102 can include external resources such as an external application server 208 and/or an external database server 206. The various elements of the media editing system 102 can communicate via various communication links through the network 108. An external resource can generally be considered a data resource owned and/or operated by an entity other than an entity that utilizes the data management system 202 and/or the media sources 110.

As used herein, a "cloud" or "cloud service" can include a collection of computer resources that can be invoked to instantiate a virtual machine, application instance, process, data storage, or other resources for a limited or defined duration. The collection of resources supporting a cloud can include a set of computer hardware and software configured to deliver computing components needed to instantiate a virtual machine, application instance, process, data storage, or other resources. For example, one group of computer hardware and software can host and serve an operating system or components thereof to deliver to and instantiate a virtual machine. Another group of computer hardware and software can accept requests to host computing cycles or processor time, to supply a defined level of processing power for a virtual machine. A further group of computer hardware and software can host and serve applications to load on an instantiation of a virtual machine, such as an email client, a browser application, a messaging application, or other applications or software. Other types of computer hardware and software are possible.

The data management system 202 can be web-based. In some embodiments, the media sources 110 can access the data management system 202 via an online portal set up and/or managed by one or more of the servers 204, e.g., the application server. In some embodiments, the media sources 110 can include one or more applications that access the services of the data management system 202 via one or more application programming interfaces (APIs) and that access the processes of the media editing system 102. The media editing system 102 and the media sources 110 can communicate through the network 108. Elements of the media editing system 102, such as the database server 206 and/or the application server 208, can be physically housed at a location remote from an entity that owns and/or operates the media editing system 102. For example, various elements of the media editing system 102 can be physically housed at a public service provider such as a web services provider. Elements of the media editing system 102 can be physically housed at a private location, such as at a location occupied by the entity that owns and/or operates the media editing system 102.

The communication links by which the media editing system 102 and the media sources 110 communicate can be direct or indirect. A direct link can include a link between two devices where information is communicated from one device to the other without passing through an intermediary. For example, the direct link can include a Bluetooth™ connection, a Zigbee® connection, a Wifi Direct™ connection, a near-field communications (NFC) connection, an infrared connection, a wired universal serial bus (USB) connection, an ethernet cable connection, a fiber-optic connection, a firewire connection, a microwire connection, and so forth. In another example, the direct link can include a cable on a bus network. "Direct," when used regarding the communication links, can refer to any of the aforementioned direct communication links.

An indirect link can include a link between two or more devices where data can pass through an intermediary, such as a router, before being received by an intended recipient of the data. For example, the indirect link can include a wireless fidelity (WiFi) connection where data is passed through a WiFi router, a cellular network connection where data is passed through a cellular network router, a wired network connection where devices are interconnected through hubs and/or routers, and so forth. The cellular network connection can be implemented according to one or more cellular network standards, including the global system for mobile communications (GSM) standard, a code division multiple access (CDMA) standard such as the universal mobile telecommunications standard, an orthogonal frequency division multiple access (OFDMA) standard such as the long term evolution (LTE) standard, and so forth. "Indirect," when used regarding the communication links, can refer to any of the aforementioned indirect communication links.

In embodiments, various components of the media editing system 102 and the media sources 110 can include data storage and/or processing capabilities. Such capabilities can be rendered by various electronics for processing and/or storing electronic signals. For example, the media editing system 102 and the media sources 110 can include one or more processing devices and one or more memory devices.

The processing device can have volatile and/or persistent memory. The memory device can have volatile and/or persistent memory. The processing device can have volatile memory and the memory device can have persistent memory. Memory in the processing device can be allocated dynamically according to variables, variable states, static objects, and permissions associated with objects and variables in the media editing system 102 and the media sources 110. Such memory allocation can be based on instructions stored in the memory device. Memory resources at a specific device can be conserved relative to other systems that do not associate variables and other objects with permission data for the specific device. The processing device can generate an output based on an input. For example, the processing device can receive an electronic and/or digital signal. The processing device can read the signal and perform one or more tasks with the signal, such as performing various functions with data in response to input received by the processing device. The processing device can read from the memory device information needed to perform the functions. For example, the processing device can update a variable from static to dynamic based on a received input and a rule stored as data on the memory device. The processing device can send an output signal to the memory device, and the memory device can store data according to the signal output by the processing device.

The processing device can be and/or include a processor, a microprocessor, a computer processing unit (CPU), a graphics processing unit (GPU), a neural processing unit, a physics processing unit, a digital signal processor, an image signal processor, a synergistic processing element, a field-programmable gate array (FPGA), a sound chip, a multi-core processor, and so forth. As used herein, "processor," "processing component," "processing device," and/or "processing unit" can be used generically to refer to any or all of the aforementioned specific devices, elements, and/or features of the processing device.

The memory device can be and/or include a computer processing unit register, a cache memory, a magnetic disk, an optical disk, a solid-state drive, and so forth. The memory device can be configured with random access memory (RAM), read-only memory (ROM), static RAM, dynamic RAM, masked ROM, programmable ROM, erasable and programmable ROM, electrically erasable and programmable ROM, and so forth. As used herein, "memory," "memory component," "memory device," and/or "memory unit" can be used generically to refer to any or all of the aforementioned specific devices, elements, and/or features of the memory device.

In embodiments, various components of the media editing system 102 and the media sources 110 can include data communication capabilities. Such capabilities can be rendered by various electronics for transmitting and/or receiving electronic and/or electromagnetic signals. For example, various components of the media editing system 102 and the media sources 110 can include one or more communication devices. The communication device can include, for example, a networking chip, one or more antennas, and/or one or more communication ports. The communication device can generate radio frequency (RF) signals and transmit the RF signals via one or more of the antennas. The communication device can receive and/or translate the RF signals. The RF signals can be broadcast and/or received by the antennas. The communication device can generate electronic signals and transmit the RF signals via one or more of the communication ports. The communication device can receive the RF signals from one or more of the communication ports. The electronic signals can be transmitted to and/or from a communication hardline by the communication ports. The communication device can generate optical signals and transmit the optical signals to one or more of the communication ports. The communication device can receive the optical signals and/or can generate one or more digital signals based on the optical signals. The optical signals can be transmitted to and/or received from a communication hardline by the communication port, and/or the optical signals can be transmitted and/or received across open space by the networking device.

The communication device can include hardware and/or software for generating and communicating signals over a direct and/or indirect network communication link. For example, the communication component can include a USB port and a USB wire, and/or an RF antenna with Bluetooth™ programming installed on a processor, such as the processing component, coupled to the antenna. In another example, the communication component can include an RF antenna and programming installed on a processor, such as the processing device, for communicating over a Wifi and/or cellular network. As used herein, "communication device" "communication component," and/or "communication unit" can be used generically herein to refer to any or all of the aforementioned elements and/or features of the communication component.

Various of the elements in the media editing system 102 can be referred to as a "server." Such elements can include a server device. The server device can include a physical server and/or a virtual server. For example, the server device can include one or more bare-metal servers. The bare-metal servers can be single-tenant servers or multiple tenant servers. In another example, the server device can include a bare metal server partitioned into two or more virtual servers. The virtual servers can include separate operating systems and/or applications from each other. In yet another example, the server device can include a virtual server distributed on a cluster of networked physical servers. The virtual servers can include an operating system and/or one or more applications installed on the virtual server and distributed across the cluster of networked physical servers. In yet another example, the server device can include more than one virtual server distributed across a cluster of networked physical servers. The term server can refer to functionality of a device and/or an application operating on a device. For example, an application server can be programming instantiated in an operating system installed on a memory device and run by a processing device. The application server can include instructions for receiving, retrieving, storing, outputting, and/or processing data. A processing server can be programming instantiated in an operating system that receives data, applies rules to data, makes inferences about the data, and so forth. Servers referred to separately herein, such as an application server, a processing server, a collaboration server, a scheduling server, and so forth can be instantiated in the same operating system and/or on the same server device. Separate servers can be instantiated in the same application or in different applications.

Various aspects of the systems described herein can be referred to as "data." Data can be used to refer generically to modes of storing and/or conveying information. Accordingly, data can refer to textual entries in a table of a database. Data can refer to alphanumeric characters stored in a database. Data can refer to machine-readable code. Data can refer to images. Data can refer to audio. Data can refer to, more broadly, a sequence of one or more symbols. The symbols can be binary. Data can refer to a machine state that is computer-readable. Data can refer to human-readable text.

Figure 3:
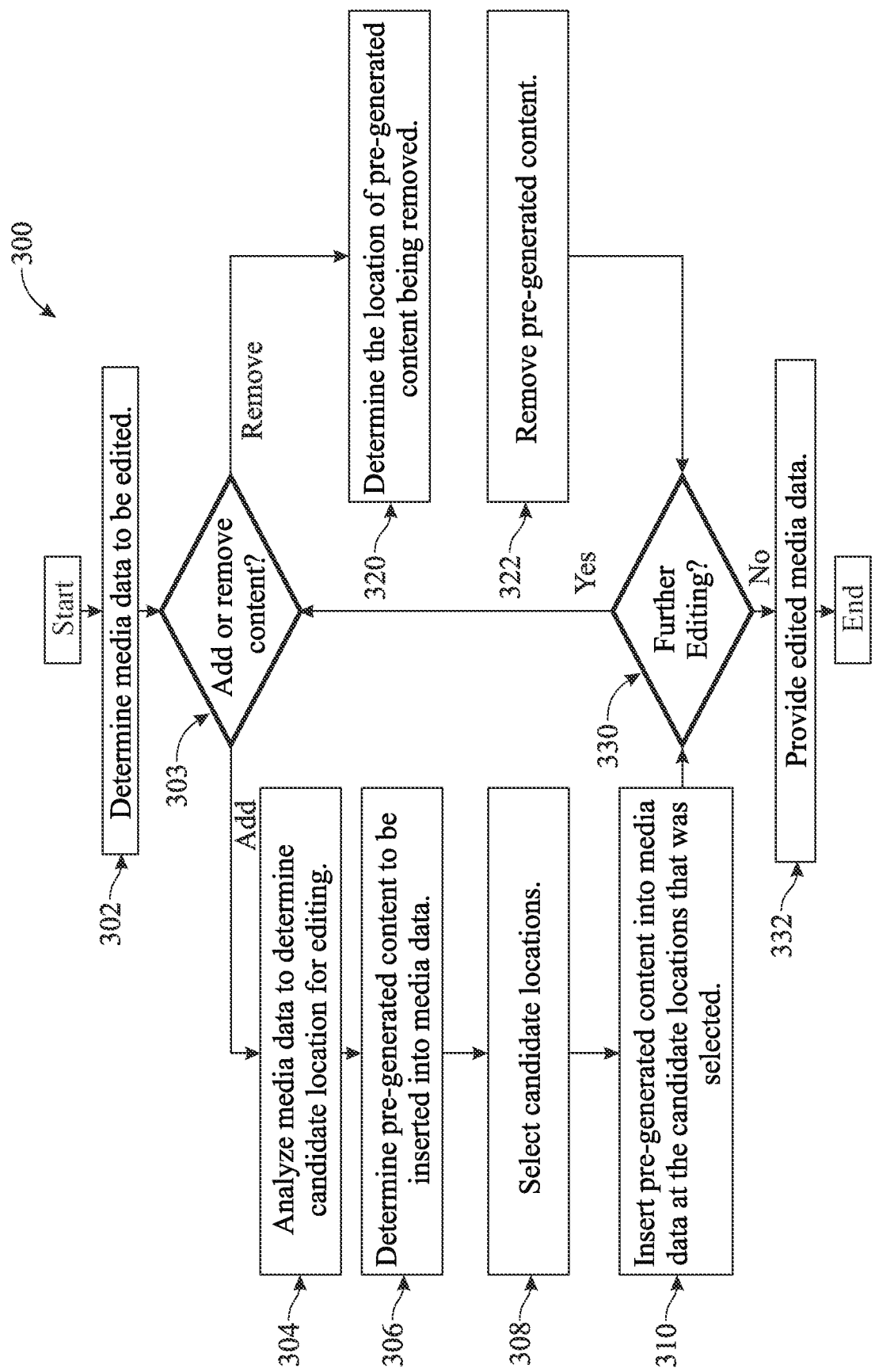
FIG. 3 presents a process diagram of automatically editing media data performed by the editing in the network environment of FIG. 1 in accordance with an embodiment of the present disclosure.

FIG. 3 illustrates a process 300 in which the media editing system 102 can edit the media data 120 in accordance with an exemplary embodiment of the present disclosure. In step 302, the media editing system 102 determines the media data 120 to be edited. In embodiments, the media data 120 can be any type of data that includes content to be viewed or consumed by a user. In embodiments, the media data 120 can include media data 120 that has not been edited to include pre-generated content. In embodiments, the media data 120 can include edited media data 130 that has been edited to include pre-generated content. For example, the media data 120 can include an audio file, an audio stream, a video file, a video stream, a multimedia presentation, and the like. The media data 120 can be received and/or retrieved from a variety of data sources 110. For example, the media data 120 can be an episode of a podcast stored in an audio file format that is provided to the media editing system 102 via the network 108. In another example, the media data 120 can be an episode of a podcast that is being recorded and provided directly to the media editing system 102 for storage and editing. In another example, the media data 120 can include a podcast that is already being consumed, and the media editing system 102 can monitor if the number of advertisement views has been met and the advertisement should be removed from the media data 120. For instance, as illustrated in FIG. 4A, an audio file 400 can include audio data 402 (e.g., sound data) representing by varying sound amplitude from a time Tstart to Tend.

In step 303, the media editing system 102 determines if content should be removed or added. If content is being added, in step 304, the media editing system 102 analyzes the media data 120 to determine candidate locations for editing. In embodiments, the candidate locations can be temporal locations within the content of the media data 120. The media editing system 102 can analyze the media data 120 to determine temporal locations within the content in which pre-generated content can be inserted with minimal interference with the content of the media data.

Figure 4A:
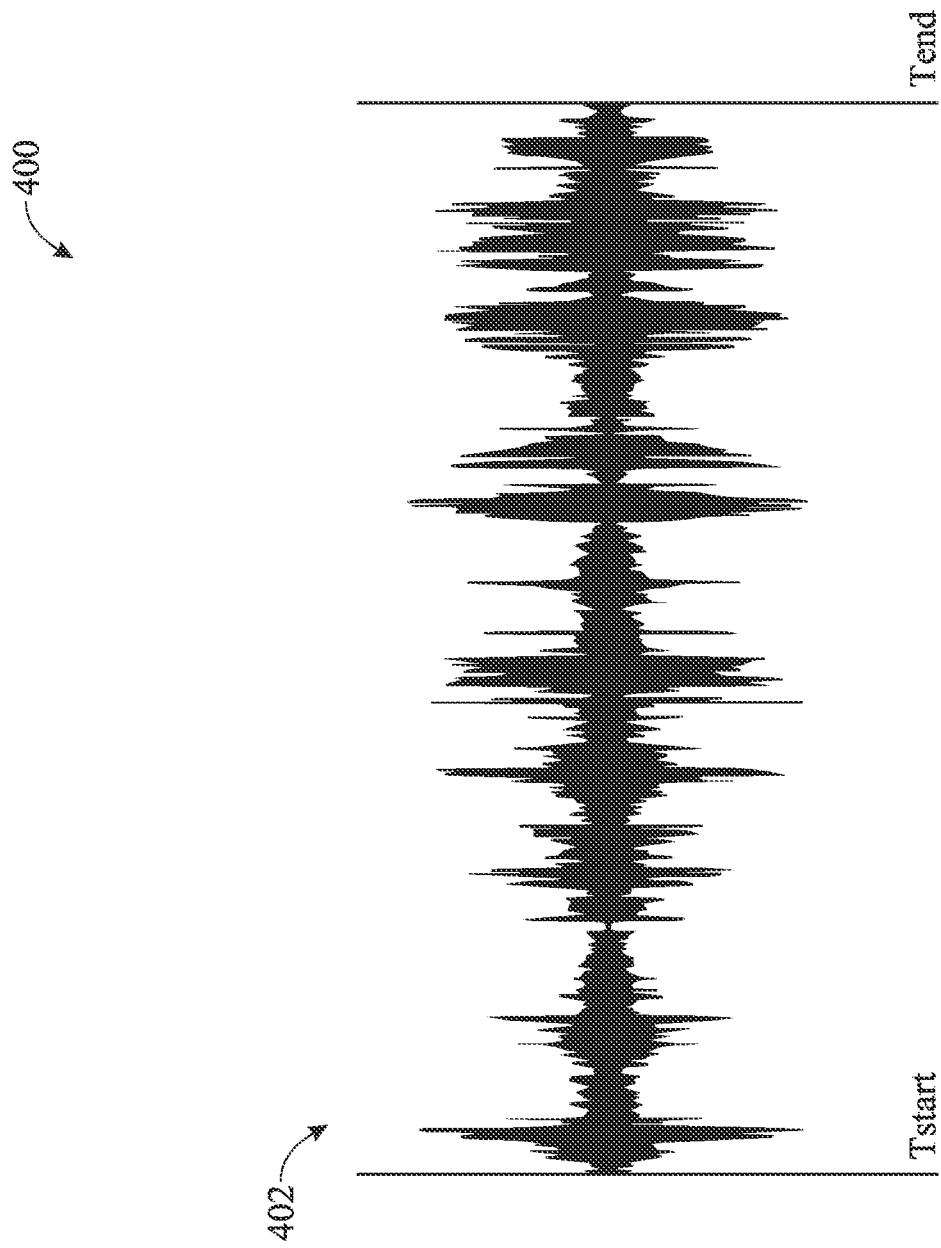
FIGS. 4A and 4B present audio data that can be used in the editing process in accordance with an embodiment of the present disclosure.
Figure 4B:
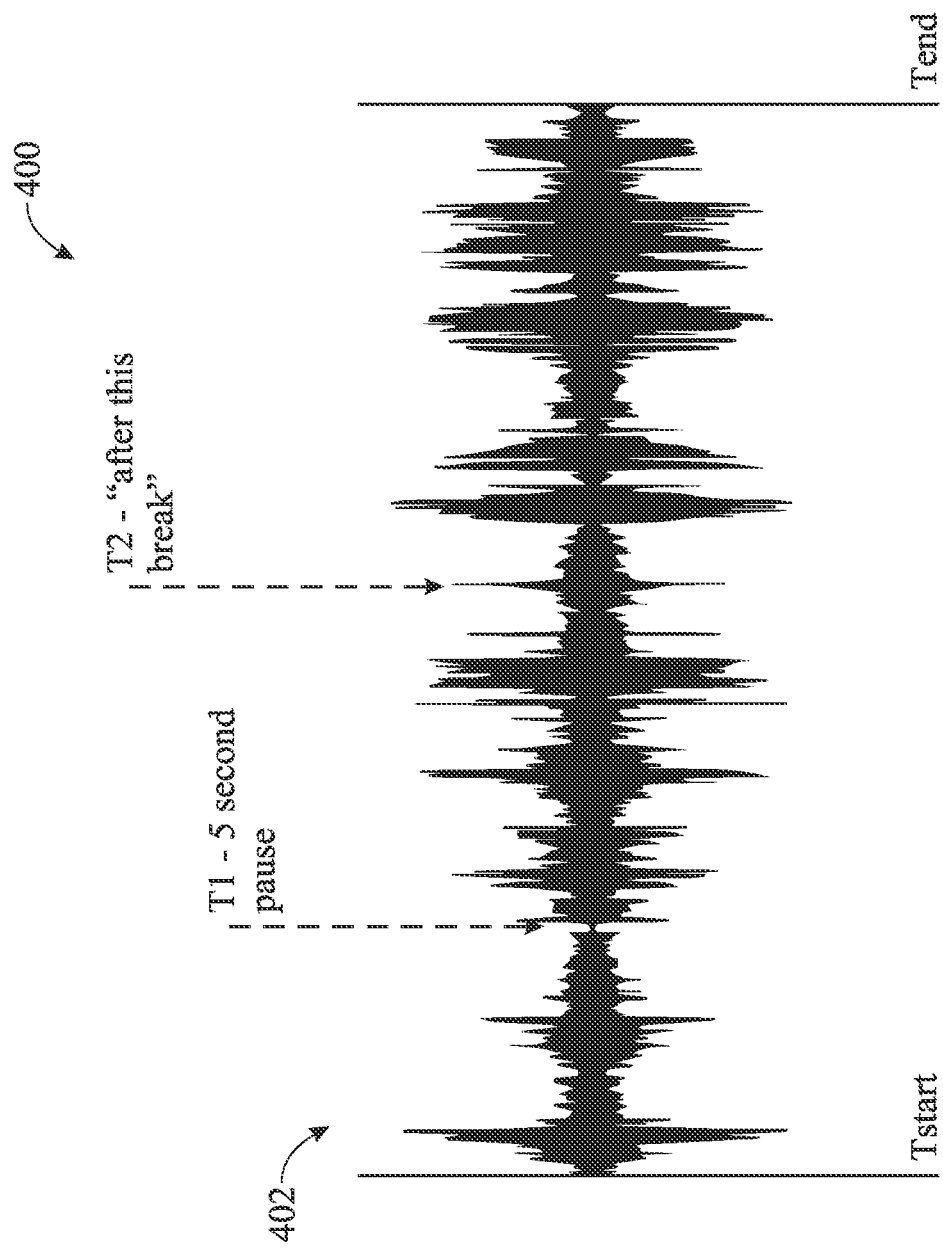

For example, referring to FIGS. 4A and 4B, the temporal location can be determined by performing one or more analyses on the audio data 402 to determine the candidate locations. In embodiments, the media editing system 102 can perform an audio-to-text conversion of the audio data 402. Once converted, the media editing system 102 can search the text conversion to identify words that might indicate a candidate's location. For example, the content creator may intentionally add speech (e.g., "after this break," at time T2) that indicates a break point. Likewise, the media editing system 102 can search for words and sentences that indicate a natural break, e.g., a change in topic.

In embodiments, the media editing system 102 can perform audio analysis on the audio data 402 to identify the candidate's location. For example, the media editing system 102 can perform frequency and/or amplitude analysis to identify pauses in the audio data 402. For instance, the media editing system 102 can identify a 5 second pause at time T1, where the amplitude falls below a threshold that includes no or little sound data.

In 306, the media editing system 102 determines pre-generated content 104 to be inserted into media data. In embodiments, the pre-generated content 104 can be auxiliary content that is intended to accompany the content of the media data. For example, the pre-generated content 104 can include advertisements, public service announcements, previews of other content, bibliographic information of the content, and the like. In embodiments, the pre-generated content 104 can be selected automatically by the media editing system 102 based on predetermined rules. In embodiments, the pre-generated content 104 can be selected by the creator and/or publisher of the media data 120. In embodiments, the pre-generated content 104 can be selected by the operator of the media editing system 102.

In step 308, one or more candidate locations are selected. In embodiments, the candidate locations can be selected by the operator of the media editing system 102, the creator of the media data 120, the publisher of the media data 120, an entity associated with the pre-generated content, and the like. In embodiments, the media editing system 102 can automatically select candidate locations based on one or more parameters and/or rules. For example, the media editing system 102 can select one or more candidate locations that are equally distributed in time throughout the content of the media data 120. In another example, the media editing system 102 can select candidate locations that cause the least impact on the content of the media data, for instance, interrupting dialog in the media content, interrupting impactful content of the media data, etc.

In embodiments, the media editing system 102 can utilize a smart insertion point finder to determine a "best" candidate location, for example, in the middle of an audio file for advertisements and promotions. In embodiments, the media editing system 102 can determine that a candidate location is "best" if it sounds smooth and intentional like a manual insertion. In order to find the best candidate locations, the media editing system 102 can utilize 3 pieces of data from the audio file: 1. Duration of the episode, 2. Silence timestamps, and 3. Speaker Changes.

The media editing system 102 can utilize the duration of an episode to determine the max number of insertion points. Because insertions should be distributed throughout the media data, mid-rolls should not be inserted near the beginning or end of the audio file. Media data such as Audio files can contain pre-rolls or post-rolls and it would not be a good experience for advertisements to be placed temporally near the existing rolls. As such, in determining the best candidate location, the media editing system 102 can remove a pre-determined amount from the beginning and end of the media data to identify a middle portion, for example, the first and last 8 minutes. The media editing system 102 can then set a floor for the amount of data required to find the best candidate locations, for example, 7 minutes. Then, the media editing system 102 can split the remaining middle portion of the media data by the floor, e.g., by 7, because 7 minutes is our minimum requirement of time in order to have enough data to find at least one good insertion location. For instance, if an audio file is 30 minutes long, the media editing system 102 can examine the middle 14 minutes (e.g., remove the first 8 minutes and last 8 minutes) and then divide by 7 to determine 2 possible advertisement spots.

In embodiments, the media editing system 102 can utilize a detection algorithm to generate silence timestamps. For example, silence timestamps can be generated utilizing FFMPEG's silence detect command. The media editing system 102 can generate an object for each silence in order to know the duration of the silence and the start and end times. When using the silence detect command, the media editing system 102 can set a noise level, for example, −20 DB, and utilize silences having a pre-determined duration, for example, where the duration is longer than 0.3 seconds. The media editing system 102 can then mark the beginning (or other temporal location) of the silences as the silence timestamps. The media editing system 102 can utilize other data of the silences (e.g., duration, temporal location, etc.) when selecting the silences to use.

The media editing system 102 can determine speaker changes by analyzing diarization data. The diarization data is a list of speaker segments. Each speaker segment is made up of a speaker identity label, start timestamp, and end timestamp. Utilizing those speaker segments, the media editing system 102 can determine that a speaker change corresponds to a speaker segment where a following speaker segment has different speaker identities.

Once the media editing system 102 determines these factors, the media editing system 102 can determine the best and/or ideal speaker changes. In order to do this, the media editing system 102 can analyze additional information for each speaker segment and each speaker change. For the speaker segments, the media editing system 102 can flag overlapped speech near a speaker change, e.g., either 3 seconds before or 3 seconds after. For speaker changes, the media editing system 102 can flag ones where there is a clean break from the first speaker to the next speaker. For example, the break of silence between the two speakers can be set to be greater than 0 seconds but less than 5 seconds. The 5-second limit is due to the way speaker segmentation works. For instance, if person A stops speaking, then there is 20 seconds of music followed by person B speaking, the media editing system 102 can set this as a 20-second gap. Even if the gap was silent, the gap can be too large to insert an advertisement and have the inserted advertisement feel natural unless the silences in the middle of the audio file are trimmed.

Then, the media editing system 102 can find all the best candidate locations, e.g., the best silence timestamps for the audio file. This process is performed multiple times because each pass-through finds the best available insertion timestamp. In each pass, the media editing system 102 can first remove all previously found silences and any silences within a pre-determined temporal distance, e.g., 7 minutes of those previously found. The media editing system 102 can also remove any silences within a pre-determined temporal distance from the beginning and end of the media data, e.g., the first or last 8 minutes of the audio file. Once removed, the remaining silences correspond to the available silences.

Next, the media editing system 102 can determine which speaker change to use by examining certain aspects of the data to see if a match with a silence timestamp can be determined. To find a match, the media editing system 102 compare the speaker change midpoint timestamp with the silence midpoint timestamp. The media editing system 102 can select a closest silence timestamp, and if the time difference is less than or equal a predetermined amount, e.g., 1 second, the media editing system 102 can mark the silence as a match. The following can be an order of speaker changes the media editing system 102 attempts to match with silences:
1. Speaker change with no overlapped speech within 3 seconds of the speaker change timestamp, the gap between the previous and next speaker segment is longer than 0 seconds but shorter than 5 seconds;
2. Speaker change where the gap between the previous and next speaker segment is longer than 0 seconds but shorter than 5 seconds;
3. Speaker change with no overlapped speech within 3 seconds of the speaker change timestamp; and
4. Any speaker change.

From this, the media editing system 102 identifies the type of speaker changes and the corresponding silence matches to use for the final process. The media editing system 102 can also use instances where the speaker changes have both previous or next segment durations longer than 3 seconds, or at least one. This is because the media editing system 102 can consider speaker changes where people are talking for a long period of time instead of short back and forths.

If at least one silence match exists, the media editing system 102 can prefer:
1. Both long speaker segments silence matches;
2. At least one long speaker segment silence matches;
3. Any speaker change silence matches; and
4. If there are any silences then try to match all the segments with the silences;
    a. If there is at least one match use that; and
    b. Or else use the silences Using the data described above, the media editing system 102 can find the silence match with the longest duration of silence and grab the midpoint timestamp of the silence. This is the piece of data the whole loop was searching to collect. The media editing system 102 can then loop through the process again to find the next timestamp. This can be looped through as many times as needed from analyzing the episode duration described above.

In step 310, the media editing system 102 inserts pre-generated content 104 into the media data 120 at the candidate locations that were selected. In embodiments, the media editing system 102 can, as required, decode the media data 120 and/or transform the media data 120 into a format that can be edited. The media editing system 102 can splice the pre-generated content 104 into the media data 120 at the candidate locations. Additionally, the media editing system 102 can encode and/or transform the media data 120 to generate the edited media data 130. The media editing system 102 can provide the edited media data 130 to any relevant parties, e.g., owner of the media data 120, creator of the media data 120, publisher of the media data 120, etc.

Returning to step 303, if content is being removed, in step 320, the media editing system 102 determines the location of pre-generated content being removed. In embodiments, the media editing system 102 can store the locations where the pre-generated content 104 was previously inserted and retrieve the location once the content is removed. In an embodiment, the media editing system 102 can analyze the media data to determine the location of the pre-generated content 104 using the audio analysis described above. Once located, in step 322, the pre-generated content 104 is removed. For example, the media editing system 102 can remove the pre-generated content 104, for example, if a platform does not allow the advertisement or adds its own advertisements, prior to distributing the media data to the media directories and/or platforms 112. In another example, if an advertiser buys 10,000 ad downloads, then once the ad is downloaded 10,000 times, the media editing system 102 can automatically remove the advertisement, and the media file will be stitched back together and distributed as if it had never been altered.

In 330, the media editing system 102 determines if further editing is performed. If further editing is performed, process 300 can return to step 303. If editing is complete, in step 332, the media editing system 102 can provide the edited media data 130 and the operations end. The media editing system 102 can provide the edited media data 130 to the media sources 110, for example, via the network 108. In embodiments, the media editing system 102 can provide the edited media data 130 to media directories and/or consumption platforms 112 where the edited media data 130 can be publicly available. For example, in the case of a podcast, the edited media data 130 (e.g., the podcast including the inserted advertisements) can be distributed to podcast directories (e.g., Apple Podcasts, Spotify, Google Podcasts, webpages, etc.) so that the public can listen to the edited media data 130 including the advertisements.

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention. A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. "Software" may refer to prescribed rules to operate a computer. Examples of software may include code segments in one or more computer-readable languages; graphical and or/textual instructions; applets; pre-compiled code; interpreted code; compiled code; and computer programs. A network is a collection of links and nodes (e.g., multiple computers and/or other devices connected together) arranged so that information may be passed from one part of the network to another over multiple links and through various nodes. Examples of networks include the Internet, the public switched telephone network, wireless communications networks, computer networks (e.g., an intranet, an extranet, a local-area network, or a wide-area network), wired networks, and wireless networks.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media. When a single device or article is described herein, it will be readily apparent that more than one device/article (whether or not they cooperate) may be used in place of single device/article. Similarly, where more than one device or article is described herein (whether or not they cooperate), it will be readily apparent that a single device/article may be used in place of the more than one device or article. The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-transitory, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, a RAM, a PROM, an EPROM, a FLASH-EEPROM, removable media, flash memory, a "memory stick", any other memory chip or cartridge, a carrier wave as described hereinafter, or any other medium from which a computer can read. Various forms of computer readable media may be involved in carrying sequences of instructions to a processor. For example, sequences of instruction may be delivered from RAM to a processor, may be carried over a wireless transmission medium, and/or may be formatted according to numerous formats, standards or protocols, such as Bluetooth, 4G, 5G, etc.

Where databases are described, it will be understood by one of ordinary skill in the art that alternative database structures to those described may be readily employed, and other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only, those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a non-transitory computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units. A "network" may refer to a number of computers and associated devices that may be connected by communication facilities. A network may involve permanent connections such as cables or temporary connections such as those made through the telephone or other communication links. A network may further include hard-wired connections (e.g., coaxial cable, twisted pair, optical fiber, waveguides, etc.) and/or wireless connections (e.g., radio frequency waveforms, free space optical waveforms, acoustic waveforms, etc.). Examples of a network may include: an internet, such as the Internet; an intranet; a LAN; a wide area network (WAN); and a combination of networks, such as an internet and an intranet.

As noted above, in some embodiments the method or methods described above may be executed or carried out by a computing system including a non-transitory computer-readable storage medium, also described herein as a storage machine, that holds machine-readable instructions executable by a logic machine (i.e., a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a GUI, or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method(s) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

Unless specifically stated otherwise as apparent from the above discussion, it is appreciated that throughout the description, discussions utilizing terms such as "identifying" or "calculating" or "determining" or "executing" or "performing" or "collecting" or "creating" or "sending" or the like, refer to the action and processes of an electronic system, a computer system, or similar electronic computing device, that manipulates and transforms data represented as physical (electronic) quantities within the computer system's registers and memories into other data similarly represented as physical quantities within the computer system memories or registers or other such information storage devices.

To the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Since many modifications, variations, and changes in detail can be made to the described exemplary embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A non-transitory computer readable medium having executable code stored thereon, that when executed, cause a data processing system to perform operations comprising
identifying media data to be edited;
analyzing the media data identified and identifying one or more candidate locations therein for editing based on at least one content portion of the media data analyzed;
determining at least one item of pre-generated content to be inserted into the media data;
selecting at least one of the one or more candidate locations identified;
editing the media data analyzed by inserting the at least one item of pre-generated content into the media data analyzed at least one of the one or more candidate locations selected;
identifying a duration of an episode from the media data analyzed; and
using the duration identified, determining a maximum number of insertion points.

2. The non-transitory computer readable medium of claim 1, wherein the pre-generated content comprises at least one of advertisements, public service announcements, previews of other content, and bibliographic information.

3. The non-transitory computer readable medium of claim 1, wherein the operations performed by the data processing system further comprise:
automatically selecting by a media editing system, the pre-generated content based on predetermined rules.

4. The non-transitory computer readable medium of claim 1, wherein the operations performed by the data processing system further comprise:
receiving a selection of the pre-generated content from a creator or publisher of the media data.

5. The non-transitory computer readable medium of claim 1, wherein the selecting at least one of the one or more candidate locations is performed automatically by a media editing system.

6. The non-transitory computer readable medium of claim 1, wherein the selecting at least one of the one or more candidate locations is performed by a creator or publisher of media data.

7. The non-transitory computer readable medium of claim 1, wherein the one or more candidate locations selected are equally distributed in time throughout the at least one content portion of the media data.

8. The non-transitory computer readable medium of claim 1, wherein the one or more candidate locations selected minimize adverse impacts on the at least one content portion of the media data.

9. The non-transitory computer readable medium of claim 1, wherein the operations performed by the data processing system further comprise:
generating a plurality of silence timestamps from the media data analyzed.

10. The non-transitory computer readable medium of claim 9, wherein each silence timestamp of the plurality of silence timestamps has a respective duration that does not exceed five (5) seconds.

11. The non-transitory computer readable medium of claim 1, wherein the operations performed by the data processing system further comprise:
identifying a plurality of speaker changes from the at least one content portion of the media data by analyzing diarization data.

12. The non-transitory computer readable medium of claim 11, wherein the diarization data analyzed comprises a list of speaker segments and wherein each speaker segment of the list comprises at least a speaker identify label, a start timestamp, and an end timestamp.

13. The non-transitory computer readable medium of claim 1, wherein the media data comprises at least one of an audio file, an audio stream, a video file, a video stream, and a multimedia presentation.

14. A non-transitory computer readable medium having executable code stored thereon, that when executed, cause a data processing system to perform operations comprising
identifying media data to be edited;
analyzing the media data identified and identifying one or more candidate locations therein for editing based on at least one content portion of the media data analyzed;
determining at least one item of pre-generated content to be inserted into the media data;
selecting at least one of the one or more candidate locations identified;
editing the media data analyzed by inserting the at least one item of re-generated content into the media data analyzed at least one of the one or more candidate locations selected;
providing the edited media data to a plurality of media directories and consumption platforms; and
removing the at least one item of pre-generated content inserted into the edited media data prior to the providing of the edited media data to at least one of the media directories and consumption platforms based on a content restriction specific to the at least one of the media directories and consumption platforms.

15. A non-transitory computer readable medium having executable code stored thereon, that when executed, cause a data processing system to perform operations comprising
identifying media data to be edited, wherein the media data identified comprises at least one of an audio file, an audio stream, a video file, a video stream, and a multimedia presentation;
analyzing the media data identified and identifying one or more candidate locations therein for editing based on at least one content portion of the media data analyzed;
determining at least one item of re-generated content to be inserted into the media data selecting at least one of the one or more candidate locations identified;
editing the media data analyzed by inserting the at least one item of re-generated content into the media data analyzed at the at least one of the one or more candidate locations selected, wherein the Me-generated content comprises at least one of advertisements, public service announcements, previews of other content, and bibliographic information;
providing the edited media data to a plurality of media directories and consumption platforms; and
removing the at least one item of pre-generated content inserted into the edited media data prior to the distribution of the edited media data to at least one of the media directories and consumption platforms based on a content restriction specific to the at least one of the media directories and consumption platforms.

16. The non-transitory computer readable medium of claim 15, wherein the one or more candidate locations selected (i) are equally distributed in time throughout the at least one content portion of the media data; or (ii) minimize adverse impacts on the at least one content portion of the media data analyzed.

17. A non-transitory computer readable medium having executable code stored thereon, that when executed, cause a data processing system to perform operations comprising:
identifying media data to be edited;
analyzing the media data identified and identifying one or more candidate locations therein for editing based on at least one content portion of the media data analyzed;
determining at least one item of pre-generated content to be inserted into the media data analyzed;
selecting at least one of the one or more candidate locations identified for either (i) equal distribution in time throughout the at least one content portion of the media data or (ii) minimizing adverse impacts on the at least one content portion of the media data analyzed;
editing the media data analyzed by inserting the at least one item of pre-generated content into the media data analyzed at the at least one of the one or more candidate locations selected, wherein the pre-generated content comprises at least one of advertisements, public service announcements, previews of other content, and bibliographic information;
removing the at least one item of pre-generated content inserted into the edited media data prior to the distribution of the edited media data to at least one of a plurality of media directories and consumption platforms based on a content restriction specific to the at least one of the media directories and consumption platforms; and providing the edited media data to the plurality of media directories and consumption platforms.

\* \* \* \* \*